Figure 2:
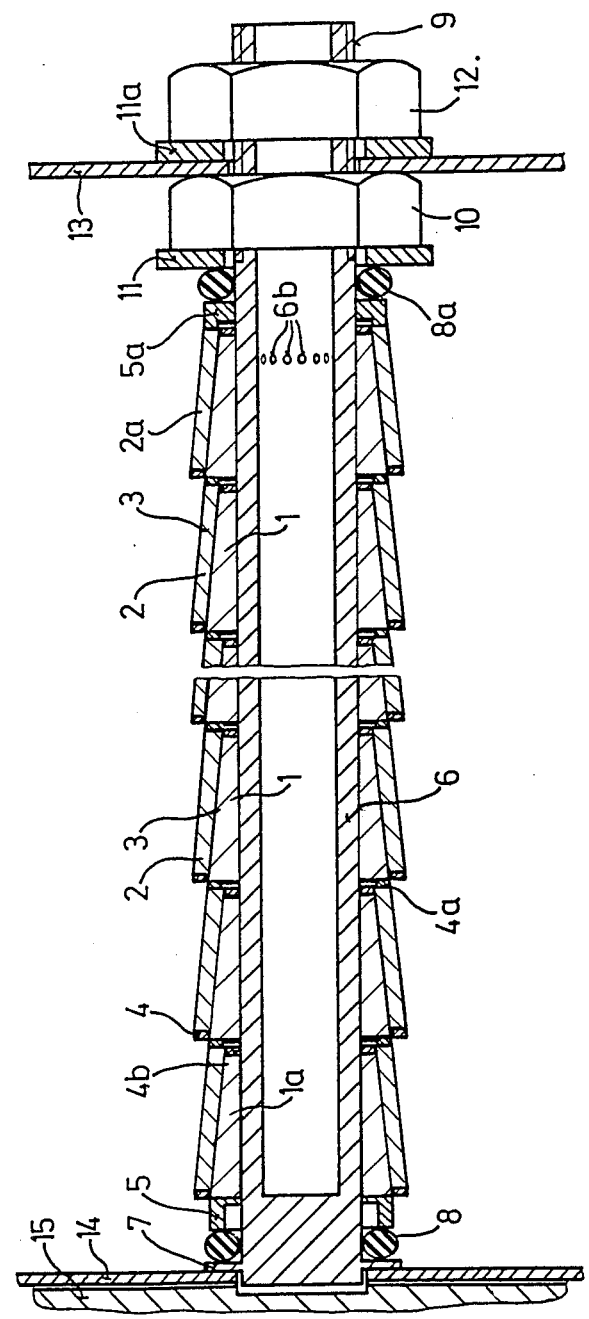

United States Patent [19]

Sterzel

[11] Patent Number: 4,774,153
[45] Date of Patent: Sep. 27, 1988

[54] BATTERIES COMPRISING HIGH ENERGY AND POWER DENSITY METHANOL/AIR FUEL CELLS WITH POLYMERIC ELECTROLYTES IN TUBULAR CONFIGURATION

[75] Inventor: Hans-Josef Sterzel, Dannstadt-Schauernheim, Fed. Rep. of Germany

[73] Assignee: BASF Aktiengesellschaft, Ludwigshafen, Fed. Rep. of Germany

[21] Appl. No.: 119,494

[22] Filed: Nov. 12, 1987

[30] Foreign Application Priority Data

Nov. 25, 1986 [DE] Fed. Rep. of Germany ....... 3640209

[51] Int. Cl.[4] .......................................... H01M 8/10
[52] U.S. Cl. ...................................... 429/12; 429/31; 429/32; 429/41
[58] Field of Search .................. 429/34, 27, 12, 41, 429/30, 33, 31, 32, 45

[56] References Cited

U.S. PATENT DOCUMENTS

| 3,402,230 | 9/1968 | White, Jr. ............................ 429/31 |
| 3,507,705 | 4/1970 | Tannenberger et al. ............ 429/31 |
| 3,668,010 | 6/1972 | Fally et al. ........................... 429/31 |
| 4,174,260 | 11/1979 | Schmidberger .................. 429/31 X |

FOREIGN PATENT DOCUMENTS 154247 2/1985 European Pat. Off. .

OTHER PUBLICATIONS

J. Electronanal. Chem., 183(1985) pp. 391-394.
J. Electronanal. Chem., 179(1984) pp. 303-306.
J. Electronanal. Chem., 199(1986) pp. 311-322.

*Primary Examiner*—Anthony Skapars
*Attorney, Agent, or Firm*—Keil & Weinkauf

[57] ABSTRACT

A battery is composed of methanol/air fuel cells which in turn are composed of an anode (1), a cathode (2) and a $CO_2$-permeable anion exchanger membrane (3) as electrolyte, wherein anode (1) and cathode (2) are present on a common current offlead which is configured as a truncated cone having a small apex angle and internal stepping and wherein a plurality of these offleads are stacked in one another on a feed tube (6) to form a battery.

3 Claims, 2 Drawing Sheets

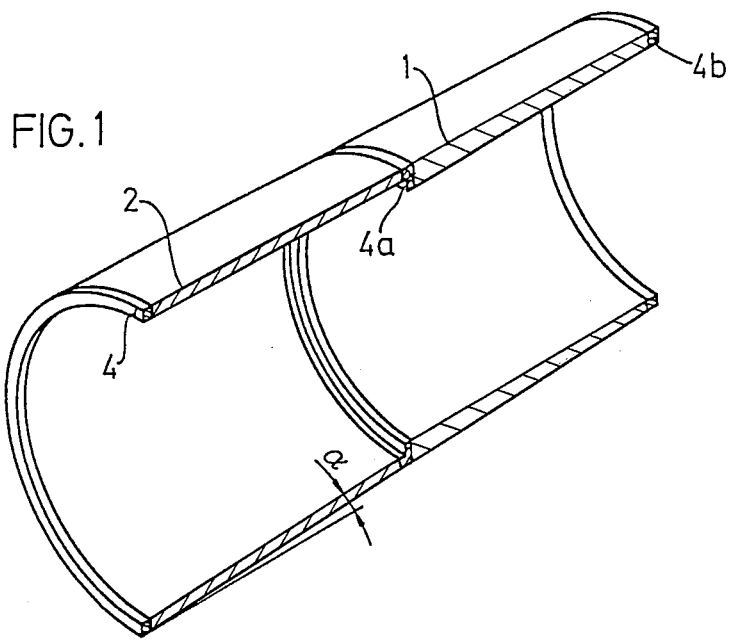
FIG. 1
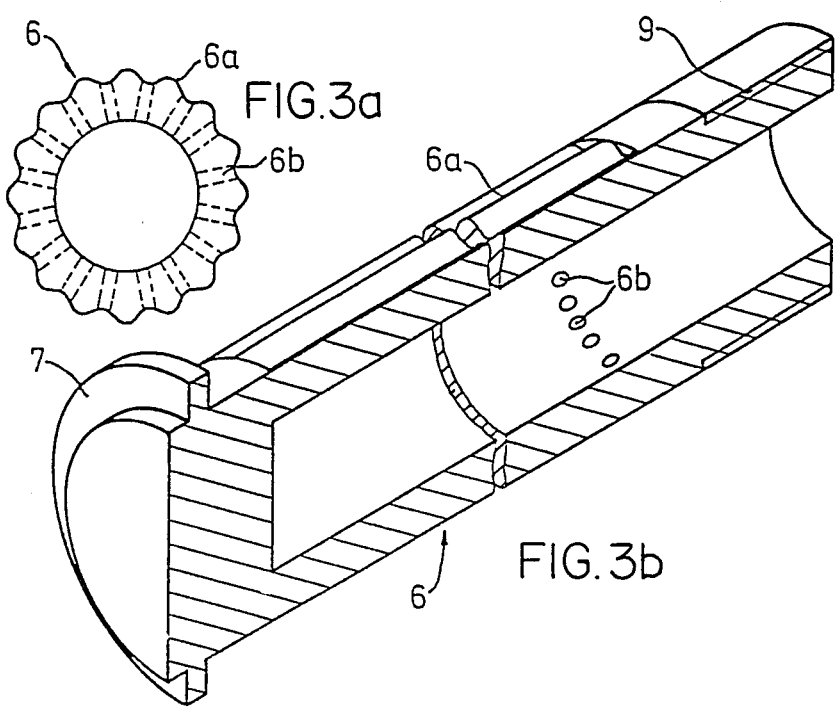
FIG. 3a
FIG. 3b

BATTERIES COMPRISING HIGH ENERGY AND POWER DENSITY METHANOL/AIR FUEL CELLS WITH POLYMERIC ELECTROLYTES IN TUBULAR CONFIGURATION

The present invention relates to a battery comprising methanol/air fuel cells which in turn are composed of a cathode, an anode and a $CO_2$-permeable anion exchanger membrane as electrolyte, wherein cathode and anode are present on a common current offlead which is configured as a cone having a small apex angle and wherein a plurality of cones are stacked in one another on a tube to form a battery.

In fuel cells, a fuel (in this case methanol) is electrochemically oxidized at an anode to carbon dioxide and water, while atmospheric oxygen is reduced at a cathode to hydroxyl ions ($OH^-$). Anode and cathode are separated by an electrolyte, in batteries comprising methanol/air fuel cells according to this invention by an $OH^-$ conducting polymeric anion exchanger membrane. If anode and cathode are connected via a consumer, electrons are made to flow from the anode to the cathode.

Heretofore no operable batteries composed of methanol/air fuel cells have been disclosed. In the prior art, methanol is catalytically converted to carbon dioxide and hydrogen, the carbon dioxide is separated off and the hydrogen is fed to the actual hydrogen/air fuel cell. The current densities obtained therein range from 0.2 to 0.3 $A/cm^2$.

Higher current densities of 1 $A/cm^2$ can be obtained in particular by means of porous, gas-permeable electrodes. The property of gas permeability is advantageous since, when the fuel cell is in operation, oxygen diffuses into the cathode and water and carbon dioxide diffuse out.

Such gas diffusion electrodes are described for example by Watanabe et al. (J. Electroanal. Chem. 183 (1985), 391–394). These electrodes are produced by sintering carbon black together with carbon black particles covered with catalyst and with or without polytetrafluoroethylene particles around a suitable offlead. The electrode obtained consists of a porous network in which the catalyst particles are in contact with one another to form a percolation network.

This reference to a percolation network is to be understood as meaning that there is a permanent connection between the catalyst particles, i.e. the catalyst particles are touching.

The catalysts used for reducing the oxygen are customarily noble metals such as platinum or silver, to name but a few.

Less costly cathodes, where the use of expensive noble metals is avoided, can be manufactured from specific polymers which contain transition metals which are as described in EP-A-154,247.

To manufacture a cathode from the polymers described therein, the offlead used is preferably a narrow wire mesh made, in particular, from stainless steel or copper. The mesh size is in general from 0.02 to 0.5 mm, and the free area accounts for not less than 20% of the total area. This offlead is then coated with an uncrosslinked polymer as described in EP-A-154,247.

To prepare the catalytically active material, carbon black having a high specific surface area (for example within the range from 200 to 500 $m^2/g$) is rendered water-wettable by oxidation in air at about 600° C. and subsequent treatment with boiling nitric acid. This carbon black is then saturated with a dilute solution of the polymer, dried, thoroughly mixed with polytetrafluoroethylene powder and molded at from 150° to 200° C. around a suitable offlead in such a way as to leave open micropores and channels.

It has proven particularly advantageous to use porous cathodes in which a layer of an anion exchanger polymer has been deposited. This layer generally ranges in thickness from 0.01 to 1 μm, preferably from 0.05 to 0.5 μm, and, constitutionally, may correspond to the anion exchanger membrane used as solid electrolyte or, alternatively, be different therefrom.

Suitable anion exchanger membranes are in principle all the commercial membranes whose solid ion content is preferably within the range from 0.5 to 5 equivalents per kg of dry membrane.

Suitable base polymers for such anion exchanger membranes are for example copolymers which are obtainable by grafting vinylpyridines onto polytetrafluoroethylene or by chloromethylation of divinylbenzene-crosslinked polystyrene and subsequent quaternization with tertiary amines. It is also possible to use copolymers of vinylbenzyl chloride and divinylbenzene. To produce the ionic groups capable of anion exchange, these polymers are reacted with corresponding monomers, for example with a trialkylamine or multifunctional amines. Suitable multi-functional amines are for example diethylenetriamine and tetraethylenepentamine.

Suitable electrode base polymers are also polyvinyl chloride films appropriately modified by reaction with amines.

The anodes can likewise be a prior art anode for methanol/air fuel cells. At present there are still no electrodes available where the use of noble metals as catalysts for oxidizing the hydrogen can be completely dispensed with.

Suitable catalysts are in particular bimetallic catalysts based on platinum/ruthenium or platinum/tin, which, compared with pure platinum catalysts, have a higher activity and lead to lower overvoltages.

Processes for manufacturing such anodes are known per se and described in the literature (for example in J. Electroanal. Chem. 179 (1984), 303 or loc. cit. 199 (1986), 311).

Anodes of particularly high activity are obtained on using a carbon black having a high specific surface area within the range from 100 to 400 $m^2/g$ as support for the catalyst.

Unlike existing cation exchanger membranes used as solid electrolytes, the current transport in the methanol/air fuel cells described takes the form of the hydroxyl ions which are formed at the cathode migrating to the anode. In the course of their migration, the hydroxyl ions carry a solvate cloud of water molecules into the anode space. On the cathode side water is continuously removed by means of the air stream which is guided past the cathode. As a consequence, a concentration gradient in terms of water is developed from the anode side to the cathode side. This concentration gradient is balanced out by water migrating from the anode side to the cathode side. This compensates for the loss on the cathode side and gives a uniform water content on the cathode and anode side, so that no additional measures for moistening the membrane on one side of the electrode are necessary.

The hydrogencarbonate ions and/or $CO_2$ formed at the anode migrate, on account of their concentration gradient and the electrostatic field within the anion exchanger membrane, from the anode to the cathode, where, as a consequence of the low carbon dioxide partial pressure present there, the hydrogencarbonate ions dissociate into hydroxyl ions and carbon dioxide.

The carbon dioxide is removed in gas form in the air stream guided past the cathode.

The development of such novel fuel cells of high energy and power density throws up problems which hitherto had no particularly high priority in the technology of fuel cells. The raising of the current density from the previous level by 0.2 $A/cm^2$ to about 1 $A/cm^2$ necessitates constructional measures to minimize losses in the conductance of current from the electrodes. Since a voltage of only 1V is discharged per cell, a battery composed of fuel cells is characterized in that it combines a low voltage, depending on the number of cells, with a high current. This necessitates high conductor cross-sections to minimize voltage loss. For reasons of conductor lay-out and since high currents coupled with low voltages are unfavorable for most consumers and regulatability likewise presents problems, a fuel cell battery should give off low currents coupled with high voltages. Advantageous operating voltages are those which correspond to the peak voltage of a standardized effective alternating voltage.

For example, it would be desirable to provide a fuel cell battery having a starting voltage of from 310 to 320V to be able to convert this direct voltage via a semiconductor circuit into an alternating voltage of 220V, for which no expensive and heavyweight transformer would be required.

To obtain high power and energy densities, volume utilization should be maximized, and to arrive at an acceptable unit cost fuel cell batteries should consist only of a few different mass-producible parts.

In the prior art, the electrodes of fuel cells are constructed in the form of flat rectangles or disks and arranged in this form in rectangular or cylindrical compartments.

In the case of fuel cells based on zirconium oxide as solid electrolyte and ceramic/metallic electrodes, it has been proposed to use cylindrical cells and the arrangement thereof into cylindrical batteries (see Chemistry and Industry, Oct. 6, 1986, page 651). Depending on the electrode diameter, usually around 10 mm, even power outputs of 0.2 watt per $cm^2$ of electrode surface led to power outputs of greater than 1 kw per liter of battery volume. Since the electrolyte also acts as a seal, sealing problems are substantially avoided.

The disadvantage with such fuel cells is that not only the catalytic activity of the electrodes but also the ion conductivity of the electrolyte require very high temperatures. For this reason such cells need to operate at around 1000° C. Electrode and electrolyte materials are thermostable inorganic materials which are deposited by chemical vapor deposition (CVD) techniques onto a porous support tube through which air or the fuel is fed.

In CVD, the individual materials or, if insufficiently thermostable, their starting compounds are vaporized at a very high temperature and deposited, likewise at high temperatures, on the substrate, in this case the porous feed tube.

This manufacturing technique is not employable for the fuel cells in question, having a specific catalyst morphology and components from organic polymers, owing to the stability loss thereof at above 200° C. Accordingly, the cell and battery construction obtainable therewith can likewise not be manufactured.

It is an object of the present invention to design a battery comprising methanol/air fuel cells with polymeric electrolytes in an optimal cylindrical configuration with the aims of high energy density, low ohmic losses, robust and reliable construction based on economically mass-producible parts, and good repairability.

We have found that this object is achieved with a methanol/air fuel cell battery as defined in claim 1. Further embodiments of the invention are subject-matter of the subclaims.

The most important characteristic feature of the invention is that anode and cathode of a fuel cell are present on a common current offlead which is constructed as a cone having a lower aperture angle and in that a plurality of cones are fitted together on a feed tube to form a battery. The electroconductive connection between the current offleads is the anion exchanger membrane which also acts as a barrier to the methanol and in this way seals off the cathode from the methanol. In a preferred arrangement, the methanol is guided through the tube and the air is guided past the cathode on the outside. A plurality of tubular fuel cell batteries are arranged in a common housing, and the required air is blown through by means of a blower. The methanol is supplied separately to each feed tube. This makes it possible in the event of failure to take the tube in question out of the methanol supply and then to bypass the then functionless battery element. In this case, the power output of a fuel cell battery consisting of many individual batteries is reduced only slightly, and there is no need to replace the entire battery.

In principle, it is also possible to guide the air through the tube and to surround the tube with methanol. For this embodiment, the cathodes would have to be arranged on the inside and the anodes on the outside. In this arrangement, however, it is not possible to take individual tubes out of the methanol supply, if necessary. In addition, owing to the smaller flow cross-sections compared with the preferred arrangement, a higher air pressure is required in the air supply.

By virtue of the design according to the invention, wherein the individual fuel battery tubes are bolted to a housing wall by means of a single nut, the replacement of a defect tube is accomplishable without special effort, by opening the housing, which constitutes particularly good repairability.

The contacts of the individual batteries can be connected within or without the housing in any desired manner to obtain the desired current and voltage values. It is true that in the case of connection outside the housing current leads have to be laid through the housing wall, but this also provides an easy means of checking the performance of individual battery tubes at intervals.

An illustrative embodiment of the invention is diagrammatically depicted in the drawings, where FIG. 1 shows an individual fuel cell element, FIG. 2 shows an arrangement of fuel cell elements into a tubular battery, and FIGS. 3a and 3b show a cross-section and longitudinal section through a feed tube.

The individual element for fuel cell batteries according to the invention consists of the offlead which, together with the corresponding catalyts, forms anode 1 and cathode 2. The offlead has the shape of a truncated cone which is stepped on the inside. The half apex angle α is 1–10°. The base diameter is from 8 to 30 mm, preferably from 10 to 20 mm, and corresponds to the outer diameter of feed tube 6. The offlead length ranges from 20 to 100 mm, preferably from 30 to 60 mm. The offlead consists of a perforated copper sheet or a copper wire mesh which, for mechanical reinforcement, has unperforated rings 4 at the openings and in the middle. The thickness of the offlead at the site of cathode 2 is a constant 0.3 to 2 mm, preferably 0.5 to 1 mm, and on the anode side opening 4b likewise from 0.3 to 2 mm, preferably from 0.5 to 1 mm, the thickness doubling from the opening to the middle 4a.

The manufacture of such an offlead is conventional. The individual steps comprise stamping the parts out of a perforated copper sheet or copper net, automatically welding together the surfaces for the rings 4, bending to form cylinders, welding the longitudinal seam and pressing in an appropriate mold to the desired final dimensions. Subsequently, the offleads may be nickelized.

To introduce the active catalyst material, first the anode catalyst, which consists of conductive carbon black doped with the actual bimetallic catalyst and polytetrafluoroethylene powder, is suspended in a mixture of water and methanol, and the suspension is introduced between rings 4a and 4b into the offlead.

In the same way, a suspension of conductive carbon black and polytetrafluoroethylene powder is introduced between rings 4 and 4a. Thereafter the part is dried, and the catalyst material is sintered in a mold at about 350° C. under a pressure of around $50N/cm^2$.

Subsequently, cathode 2 is saturated with a solution of polymeric catalyst, and the solvent is removed by heating. Anode 1, which is situated between rings 4a and 4b, is saturated on the outside with methanol and thereafter likewise coated with a viscous solution or dispersion of ion exchanger polymer 3. It is also possible to apply to anode 1 complete films of ion exchanger polymer 3, ring 4b likewise being covered. Since ion exchanger polymer 3, in its sealant function, also has to keep the methanol away from cathode 2, in the coating of anode 1 with the solution or dispersion of ion exchanger polymer 3, ring 4b is likewise coated at the same time, thereby ensuring the sealing function. Another effect obtained with this coating is that no metallic connection exists between the individual offlead elements, and the electroconductivity between the individual offlead elements only comes about through the ionic conductivity of ion exchanger polymer 3.

Feed tube 6 serves to supply the methanol and to give the battery structure mechanical support. Over the length with which it is covered with anodes 1 it gives off methanol for the supply thereof. To this end, the tube piece in question can consist of methanol-permeable sinter metal which has on its surface an insulating porous layer.

It is also possible to use a tube made of sinter glass or porous sintered ceramic. At one end the tube has an outer thread 9 for receiving fastening elements and at the other end an abutment 7 for receiving the tensioning force.

In a preferred embodiment, the tube material used is an inert plastic such as high density polyethylene or polypropylene. The plastics used may contain stiffening and strengthening fillers such as talcum, chalk, wollastonite and/or glass fibers. Longitudinal fluting 6a around 1 mm in depth is embossed along the length of the cathode and supplied through the bores 6b with methanol from the inside of the tube. The plastics version has, aside from low weight and flexibility, the advantage that the longitudinal fluting 6a, the abutment 7 and the thread 9 can be applied by thermoforming in a single operation. Depending on the power output required, the active tube length (length of fluting) ranges from 100 to 500 mm.

To assemble the fuel cell battery according to the invention, first the O-ring 8 is pushed against the abutment 7. This is followed by the closure ring 5 which is connected to a single anode 1a. From the closure ring 5 the current is discharged toward the outside. Subsequently the next individual elements, prepared as described, are stacked on top. The closure is formed by ring 5a, which supports a single cathode 2a and from which the current is guided toward the outside. The O-ring 8a seals in the methanol. It is tightened up using the nut 10 via the ring 11. The nut 10 is used to apply the normally low contact pressure for the individual elements. The construction permits convenient one-hole assembly on a side wall 14 of the housing. To this end, the tube is fixed in place by means of the nut 12 via the ring 11a. To increase the mechanical stability, the battery tubes are fixed into close-fit holes in the opposite side wall 14. The cover 15 seals off the battery from the outside.

By way of example, there now follow the key dimensions of a fuel cell battery having a power output of about 50–60 kw (without blower):

An individual fuel cell element is 40 mm long, the thickness of the cathode is 0.5 mm, the thickness of the anode expands from 0.5 to 1.0 mm. The base diameter is 10 mm, the half apex angle is about 2°. The active length of the feed tube of reinforced polypropylene having an outside diameter of 9.9 mm is 300 mm. 7 elements are strung up on one tube, so that including the end elements there are 15 fuel cells per tube. The power per unit area is 1 watt/$m^2$, amounting to a power output of around 90 watts per tube. A housing 450 mm in width and height and 320 mm in depth is fitted out with 625 of these tubes equally spaced 18 mm apart from tube center to tube center. This fuel cell battery produces 56 kw for a volume of 65 liters, i.e. about 860 w/liter.

I claim:

1. A battery comprising methanol/air fuel cells which in turn are composed of an anode, a cathode and a $CO_2$-permeable anion exchanger membrane as electrolyte, wherein the anode and the cathode are present on a common current offlead which is configured as a truncated cone having a small apex angle and internal stepping and wherein a plurality of these offleads are stacked in one another on a feed tube to form a battery.

2. A battery as defined in claim 1, wherein the feed tube consists of a plastics material and has longitudinal flutes which are supplied with methanol from inside the tube via holes.

3. A battery as defined in claim 1, wherein a plurality of tubular batteries are arranged in a common housing.

* * * * *